United States Patent

[11] 3,614,537

| [72] | Inventor | Angelo Introvigne<br>Stafford Springs, Conn. |
|---|---|---|
| [21] | Appl. No. | 873,824 |
| [22] | Filed | Nov. 4, 1969 |
| [45] | Patented | Oct. 19, 1971 |
| [73] | Assignee | Cole-Hersee Company<br>South Boston, Mass. |

[54] INTEGRAL-BREAKER TRAILER SOCKET WITH BIMETALLIC BREAKER BLADES
7 Claims, 7 Drawing Figs.

[52] U.S. Cl. .................................................. 317/99, 337/338
[51] Int. Cl. .................................................. H02b 1/10, H01h 37/52
[50] Field of Search ........................................... 200/61.6; 317/99; 337/335, 338

[56] References Cited
UNITED STATES PATENTS
| 3,270,249 | 8/1966 | Unsworth ................. | 317/99 |
| 3,315,131 | 4/1967 | Klimack ................... | 317/99 |

*Primary Examiner*—Lewis H. Myers
*Assistant Examiner*—Gerald P. Tolin
*Attorneys*—James E. Mrose and Mary C. Thomson ABSTRACT: Multipole sockets for electrical cabling connections with truck trailers are provided with built-in circuit breakers which are clustered and protectively housed in a compact annular array around a central socket opening and are equipped with terminals affording circuit connections through protective breakers.

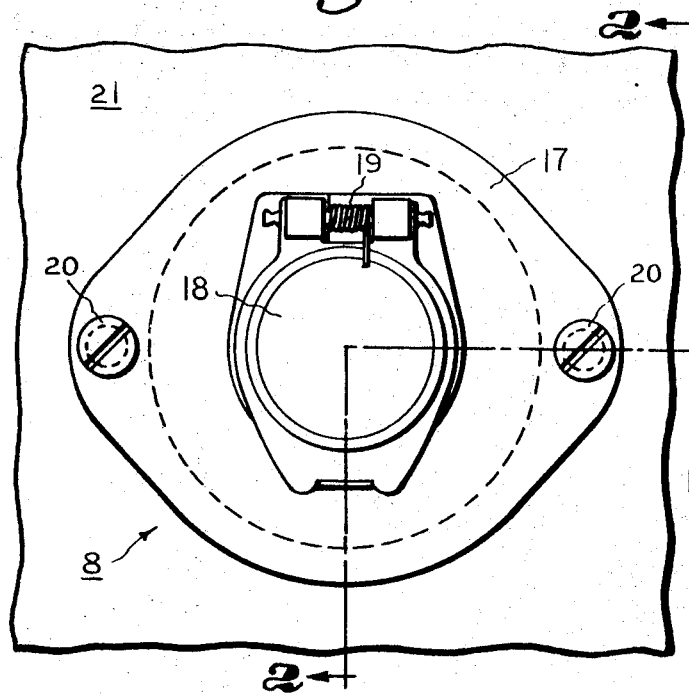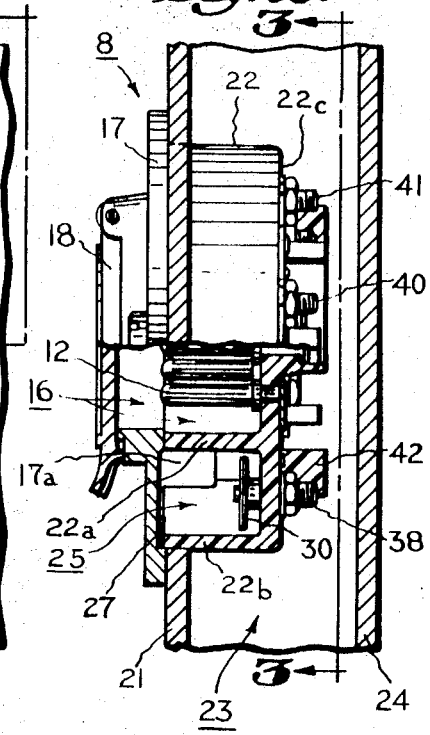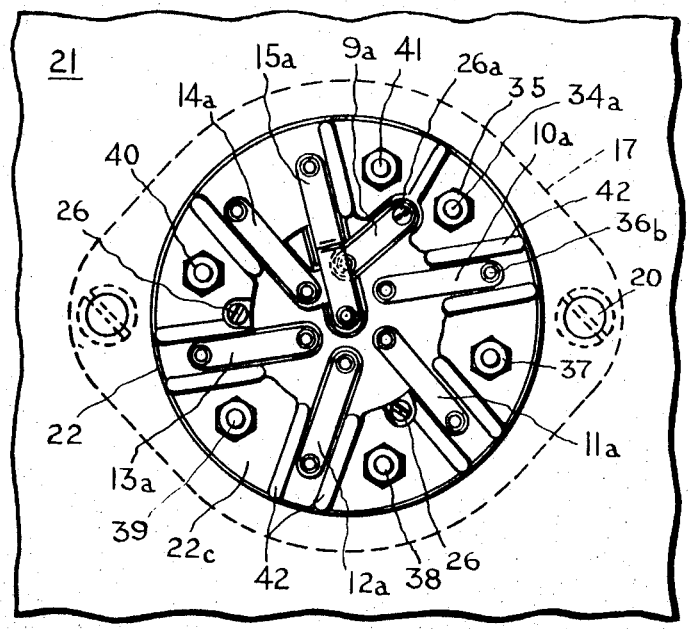

Inventor:
Angelo Introvigne,
by Thomson, Mrose & Ericson
Attorneys 3,614,537

INTEGRAL-BREAKER TRAILER SOCKET WITH BIMETALLIC BREAKER BLADES

BACKGROUND OF THE INVENTION

The present invention relates to improvements in electrical sockets such as are used in making separable electrical connections between cooperating tractor and trailer sections of trailer truck vehicles, and, in one particular aspect, to novel compact socket assemblies which are readily installed and replaced to assure breaker-protected electrical circuit connections and which are themselves of inexpensive construction incorporating multiple low-cost circuit breakers as integral elements uniquely housed and prewired for optimum service.

In typical truck tailer electrical systems, numerous separable connections are required not only to establish lighting and signalling from sources in an associated tractor, but also to enable delivery of power to refrigeration and other electrically operated auxiliary systems. Preferably, the individual circuits are separately protected by circuit breakers rated appropriately and operating to interrupt only those which develop localized faults. Early practices involved separate mountings of the breakers and the cable sockets which were located in a relatively small spaced at the front of a trailer; subsequently, the breakers were advantageously disposed around the socket itself, in a combined socket and breaker array such as is disclosed in U.S. Pat. No. 3,270,249, assigned to the same assignee as that of the present invention. The standard self-restoring electrical circuit breakers used in such combined arrays have each been of individually prepackaged types, wherein a bimetallic element and its associated contacts are mounted and housed within a protective container having a pair of exposed threaded terminals by way of which the breaker could be bolted both to the socket pins and to external circuit wiring lugs. Such an arrangement admits of incorrect wiring wherein a breaker is electrically bypassed because of connection of a wiring lug to the wrong breaker terminal, and this is particularly likely to occur when there are numerous exposed terminal studs and the external circuit connections are made by inexperienced personnel.

Self-contained circuit-breaker units of the aforementioned type tend to be relatively costly components, and prior socket arrays have taken this into account by way of provisions enabling individual faulty units to be removed and replaced conveniently. Both the prepackaged bulk of the breaker units, and the need for their rugged mountings in accessible positions whence they can be removed for replacement, have contributed to dimensions of the socket array which are greater than desired, particularly when it is intended that the accommodating openings in the supporting trailer walls be as small as possible, and preferably circular.

SUMMARY OF THE INVENTION

By way of a summary statement of practice of the present invention in one of its aspects, a compact multiconnection socket intended for mounting on truck trailers and the like is provided with a number of inexpensive bimetallic breaker elements each permanently affixed to and housed within a molded insulating member in an annular array about a central cluster of socket pins. The insulating member is advantageously in the general form of a double-walled cup, providing a central cylindrical cavity, for the socket pins, which is insulated from a surrounding annular cavity in which the breaker elements are disposed. A metal mounting plate, having a central opening aligned with the pin cavity, is in closing relation to the annular cavity containing the breakers, and preferably renders the latter cavity sealed by way of a cooperating gasket. Connections between the socket pins and one terminal of each breaker are made by way of rigid bus bar links permanently staked to them and overlying the closed outer end of the insulating member; a single threaded stud from each breaker is also exposed for an external wiring connection at the same closed end of the insulating member. Elongated breaker elements are compactly arrayed in tagential relation to the cylindrical socket pin cavity.

Accordingly, it is one of the objects of the present invention to provide a novel trailer socket of low-cost construction incorporating nonremovable circuit breakers protectively housed by cooperating parts of the socket assembly.

Another object is to provide a unique and improved compact trailer socket in which unprotected breakers are integrally mounted and housed by way of inexpensive structure making it economically feasible to replace all breakers upon occurrence of any failure.

A yet further object is to provide expendable electrical socketing, for trailers and the like, which is easily installed and replaced, and wherein bulk and cost are minimized through fixed integral mounting of breaker elements in a compact annular array enclosed by a shallow generally cylindrical insulating member.

Another object concerns the provision of a front-mounting trailer socket in which a plurality of integral circuit breakers are permanently mounted with straight link connections to socket pins and with adjustable external wiring terminals which avoid the making of unprotected circuit connections.

BRIEF DESCRIPTION OF THE DRAWINGS

Although the features of this invention which are considered to be novel are expressed in the appended claims, further details as to preferred practices and as to the objects and features may be most readily comprehended through reference to the following description taken in connection with the accompanying drawings, wherein:

FIG. 1 is a front elevation of the improved socket assembly mounted on a panel at the front wall of a trailer;

FIG. 2 is a side elevation of the mounted assembly of FIG. 1, with portions in cross section, taken along section line 2—2 of FIG. 1

FIG. 3 provides a view of the same assembly from the rear, along section line 3—3 in FIG. 2;

DETAILED DESCRIPTION OF THE PREFERRED EMBODIMENTS

Figure 4:
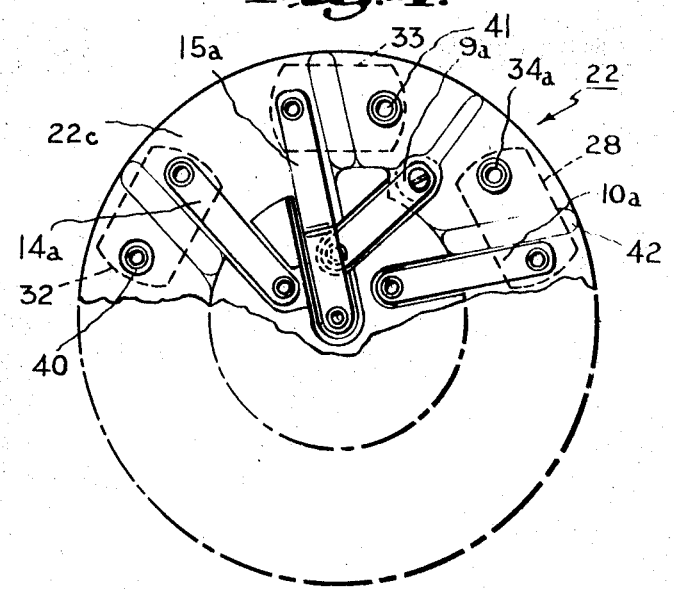
FIG. 4 views a fragment of an insulating block component of the socket assembly, from the rear, together with dashed-line representations of the associated breaker elements.
Figure 5:
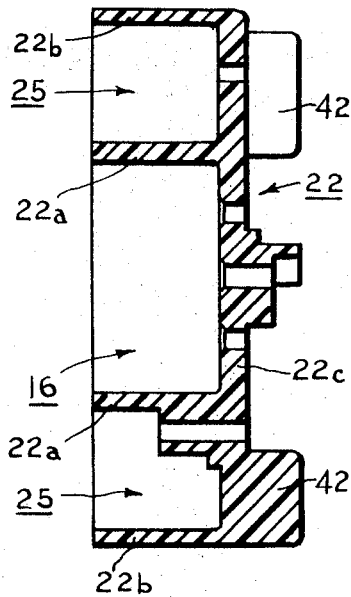
FIG. 5 is a transverse cross section of the insulating block component of the same assembly.
Figure 6:
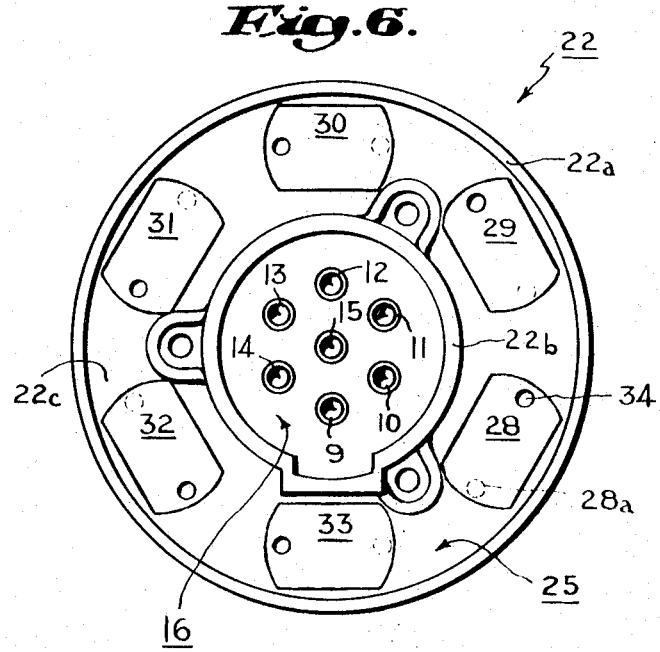
FIG. 6 portrays the insulating block assembly, with the breakers mounted in its hollow annular cavity, from the front.

Referring to the drawings, wherein like reference numerals designate identical or corresponding parts throughout the several views, the socket assembly 8 (FIGS. 1 and 2) is one which is of a seven-pole type, including seven pins 9–15 (FIG. 6) adapted to connect with the corresponding seven circuit wires of a cooperating cable plug connector (not shown) having terminals designed to mate with the pins. In other arrangements, the number of pins may be different. The cable plug is intended to be received within a central cylindrical opening 16 (FIGS. 2 and 6), the front portion of which is defined by a sturdy mounting or baseplate 17, preferably of metal, and having a self-closing cover 18 hinged to it and biased by a coil spring 19 at the hinge. Fasteners such as screws 20 secure the plate 17 to the outside of a trailer panel 21 at the front of a trailer truck body. A conveniently formed circular opening in panel 21 admits the shallow cylindrical rear section 22 of the assembly into the confined space, 23, between the outer panel 21 and inner wall 24 of the trailer body (FIG. 2); installation and removal may advantageously be made from the front, or outside, of the panel.

The rear portion of plug opening 16 is formed within a central part of the molded plastic insulating section 22, which has the aforementioned shallow cylindrical configuration and which has not only the inner annular wall 22a defining the opening 16 but, also, a radially spaced outer wall 22b which cooperates in defining an annular cavity 25 within which otherwise unprotected circuit breaker elements may be housed. Insulating section 22 is thus in the general form of a double-walled cup. Screws 26 (FIG. 3) fasten section 22 of the assembly to the front plate section 17, which has internally threaded bosses, such as 17a (FIG. 2), to receive these fasteners. Outer wall 22b fits with the back of plate 17l, and forms a relatively tight joint with it, preferably augmented by a somewhat compressible gasket 27 of plastic or cork-base material. Connector pins or prongs 9–15 are arrayed within the central opening 16 of section 22, and are staked fixedly in place in relation to the backwall 22c of that section, the individual pins also being associated with bus-bar-type connector links, 9a –15a, which are staked to the pin ends and overlie rear surfaces of the backwall 22c in making permanent connections between the pins and circuit breaker.

Figure 7:
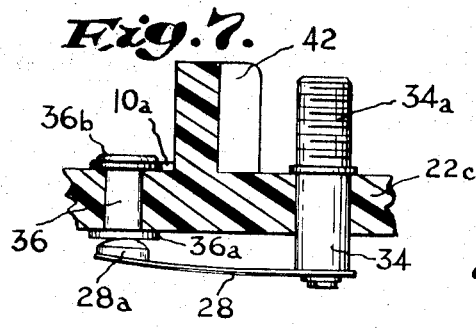
FIG. 7 is an enlarged detail of one of the circuit breakers, viewed along an edge.

Within the annular cavity 25 of the insulating section 22, there is arrayed a group of six otherwise unprotected bimetallic circuit-breaker blades 28 –33, each of which is to serve as a self-restoring current-responsive switch for temporarily interrupting a different one of the electrical circuits associated with the six socket pins 10–15, respectively, upon occurrence of an electrical fault. Such thermally responsive switches are basically well known in the art, although past practices have generally involved their being individually prepackaged in protective containers as components having a pair of external threaded terminals. By way of one distinction, the socket assembly under discusssion itself incorporates contact, connection, mounting and housing provisions for the individual breaker blades. As is own in the fragmentary illustration in FIG. 7, for example bimetal breaker blade 28, having only the usual electrical contact 28a near its movable end, is permanently cantilevered on a mounting bolt 34 which is, in turn, fixed to the back 22c of insulating section 22 and projects through it to expose a threaded terminal end 34a accommodating a nut 35 (FIG. 3) for purposes of making a separable connection with external circuit wiring of a trailer. The remaining breaker terminal, 36, is intentionally in the form of a nonadjustable stud, also permanently fixed in back 22c of insulating section 22, which carries an inner contact 36b normally engaged with breaker contact 28a, and an outer end 36b which is peened over the associated apertured pin link, 10a, to stake it in place electrically and mechanically. Others of the blades are correspondingly mounted and housed, and each is associated with but a single exposed adjustable threaded terminal, 37 –41, to which external wiring connections can readily be made; as a result, it is assured that no external circuit can be connected through the socket except through a protective breaker.

Although the cantilevered breaker elements 28 –33 are preferably somewhat elongated, the overall diameter of the cylindrical section 22 is advantageously kept relatively small by orienting the breakers substantially tangentially about the inner wall 22b. It is further advantageous that the connecting links 9a –14a are wholly flat in the improved construction, and only one, 15a, need be otherwise, to make clearance for the independent connection with the central pin, 15, of the illustrated seven. Barrier ridges, 42, projecting integrally rearwardly from the back of molded insulating section 22 conveniently isolate the external wiring connections.

When the front plate 17 and breaker-equipped rear section 22 are fastened together by screws 26, one of these, screw 26a, establishes a needed grounding connecting for pin 9, and the breaker-accommodating cavity 25 tends to be well sealed against outside influences, the more so if a gasket, 27, is used. Costs of individually sealed breaker components are avoided, and either the breaker-equipped rear section, or the assembly as a whole, may be replaced easily and economically if any breaker should fail.

Modifications, substitutions and variations in relation to the specific embodiment selected for illustration will be evident to those skilled in the art, and it is therefore to be understood that these may be effected without departure from the spirit and scope of this invention in its broader aspects and as set forth in the accompanying claims.

What I claim as new and desire to secure by Letters Patent of the United States is:

1. A trailer socket and circuit breaker combination, comprising a mounting plate member, a substantially cup-shaped insulating member, means for securing said insulating member to the rear side of said mounting member in substantially closed relationship therewith, a plurality of electrical connector members mounted in said insulating member and disposed in a cluster substantially centrally thereof, said mounting plate member having a generally circular opening therethrough in alignment with said cluster of connector members for receiving a plug carrying connections which engage said connector members, a plurality of bimetallic cicuit-breaker blades disposed within said insulating member in a substantially annular array about said cluster of connector members and directly housed in common by the enclosure formed by said insulating member in said substantially closed relationship with said mounting plate member, a plurality of fixed electrical contacts mounted on said insulating member, means connecting said fixed contacts with said connector members, and means mounting said circuit-breaker blades in said insulating member in position to engage with and disengage from said contacts responsive to flow of electrical currents through said connector members.

2. A combination as set forth in claim 1 wherein each of said circuit-breaker blades has a contact movable therewith and disposed for engagement with a different one of said fixed contacts, and wherein said means mounting said cicuit-breaker blades comprise further electrical connections extending through said insulating member for separable connections with external circuit wiring.

3. A combination as set forth in clam 2 wherein said cup-shaped insulating member is substantially cylindrical and forms a substantially tight closure with said mounting plate member, and wherein said connector members, fixed contacts and further electrical connections are affixed to the rear closed end of said insulating member.

4. A combination as set forth to claim 3 wherein said cup-shaped insulating member has an inner substantially cylindrical wall radially spaced from said outer wall and in surrounding relation to said cluster of connector members, and wherein said circuit-breaker blades are disposed in the annular cavity between said inner and outer walls.

5. A combination as set forth in claim 3 wherein said circuit-breaker blades are elongated, and wherein said circuit-breaker blades are each disposed in a substantially tangential orientation relative to the cylindrical configuration of said insulating member.

6. A combination as set forth in claim 3 wherein said connector members and fixed contacts extend through said rear closed end of said insulating member, and wherein said means connecting said contacts with said connector members comprise conductor bars overlying the rear of said closed end of said insulating member and each nonseparably affixed at one end to one of said connector members and at the opposite end to one of said contacts.

7. A combination as set forth in claim 6 wherein said further electrical connections extending through said rear closed end of said insulating member are threaded for making separable electrical connections with external circuit wiring.

75